United States Patent
Story, Jr. et al.

(10) Patent No.: US 9,002,746 B2
(45) Date of Patent: *Apr. 7, 2015

(54) LICENSE MANAGEMENT FOR DIGITAL CONTENT

(75) Inventors: Guy A. Story, Jr., New York, NY (US);
Rozsa E. Kovesdi, Madison, NJ (US);
Ajit V. Rajasekharan, East Brunswick, NJ (US); Benjamin Che-Ming Jun, Palo Alto, CA (US)

(73) Assignee: Audible, Inc., Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,815

(22) Filed: May 7, 2012

(65) Prior Publication Data

US 2012/0255037 A1 Oct. 4, 2012

Related U.S. Application Data

(63) Continuation of application No. 09/222,336, filed on Dec. 28, 1998, now Pat. No. 8,175,977.

(51) Int. Cl.
*G06F 21/00* (2013.01)
*G06Q 30/06* (2012.01)
*G06F 21/10* (2013.01)

(52) U.S. Cl.
CPC ............. *G06Q 30/06* (2013.01); *G06F 21/10* (2013.01)

(58) Field of Classification Search
USPC .......................................... 705/59; 726/1, 26
See application file for complete search history.

(56) References Cited

U.S. PATENT DOCUMENTS

| | | | |
|---|---|---|---|
| 3,763,330 | A | 10/1973 | Fulwiler |
| 3,871,112 | A | 3/1975 | Licitis |
| 4,159,417 | A | 6/1979 | Rubincam |
| 4,266,243 | A | 5/1981 | Shutterly |

(Continued)

FOREIGN PATENT DOCUMENTS

| | | |
|---|---|---|
| EP | 0128093 | 12/1984 |
| EP | 0302710 | 2/1989 |

(Continued)

OTHER PUBLICATIONS

Aural Hygiene. Auto Week, Nov. 14, p. 10.

(Continued)

*Primary Examiner* — Tsan-Yu J Huang
(74) *Attorney, Agent, or Firm* — Knobbe, Martens, Olson & Bear, LLP (57) ABSTRACT

Aspects of the present disclosure relate to managing licenses for playback of digital content. A license management device may create licenses that determine the number of playback devices that can be authorized by the license. Each license may be included in a corresponding digital content. In addition, each license may be distributed to a set of playback devices. Thereafter, a playback device may playback digital content that includes a license when the playback device stores a matching license. A single license can be used to provide authorization to play digital content from multiple sources and/or multiple types of content. Playback devices can store multiple licenses, which allows playback devices to belong to multiple sets of playback devices authorized to playback various digital content. In one embodiment digital content files can contain multiple licenses to allow the content files to be shared by multiple sets of playback devices.

20 Claims, 7 Drawing Sheets

(56) References Cited

U.S. PATENT DOCUMENTS

| | | |
|---|---|---|
| 4,393,277 A | 7/1983 | Besen et al. |
| 4,455,651 A | 6/1984 | Baran |
| 4,473,824 A | 9/1984 | Claytor |
| D276,626 S | 12/1984 | Lockwood |
| 4,490,810 A | 12/1984 | Hon |
| 4,499,568 A | 2/1985 | Gremillet |
| 4,545,023 A | 10/1985 | Mizzi |
| 4,575,621 A | 3/1986 | Dreifus |
| 4,591,974 A | 5/1986 | Dornbush et al. |
| 4,601,011 A | 7/1986 | Grynberg |
| 4,658,093 A | 4/1987 | Hellman |
| D289,777 S | 5/1987 | Thomas |
| 4,682,368 A | 7/1987 | Takahashi |
| 4,698,776 A | 10/1987 | Shibata |
| 4,725,977 A | 2/1988 | Izumi et al. |
| 4,772,873 A | 9/1988 | Duncan |
| 4,779,080 A | 10/1988 | Coughlin et al. |
| 4,788,543 A | 11/1988 | Rubin |
| 4,788,675 A | 11/1988 | Jones et al. |
| 4,791,565 A | 12/1988 | Dunham et al. |
| 4,851,931 A | 7/1989 | Parker et al. |
| 4,855,725 A | 8/1989 | Fernandez |
| 4,885,725 A | 12/1989 | McCarthy et al. |
| 4,891,838 A | 1/1990 | Faber |
| 4,899,292 A | 2/1990 | Montagna et al. |
| D306,589 S | 3/1990 | Murayama |
| 4,916,441 A | 4/1990 | Gombrich |
| 4,924,378 A | 5/1990 | Hershey et al. |
| 4,937,863 A | 6/1990 | Robert et al. |
| 4,941,040 A | 7/1990 | Pocock et al. |
| 4,949,187 A | 8/1990 | Cohen |
| 4,963,995 A | 10/1990 | Lang |
| 4,989,179 A | 1/1991 | Simko |
| 5,008,872 A | 4/1991 | Tomoda et al. |
| 5,018,017 A | 5/1991 | Sasaki et al. |
| 5,042,070 A | 8/1991 | Linna et al. |
| 5,055,947 A | 10/1991 | Satoh |
| 5,065,258 A | 11/1991 | Warren et al. |
| 5,065,345 A | 11/1991 | Knowles et al. |
| 5,091,939 A | 2/1992 | Cole et al. |
| 5,091,942 A | 2/1992 | Dent |
| 5,099,422 A | 3/1992 | Foresman et al. |
| 5,115,508 A | 5/1992 | Hatta |
| 5,121,492 A | 6/1992 | Saville, III et al. |
| 5,126,990 A | 6/1992 | Efron et al. |
| 5,132,992 A | 7/1992 | Yurt et al. |
| 5,133,076 A | 7/1992 | Hawkins et al. |
| D330,544 S | 10/1992 | Kane |
| 5,153,729 A | 10/1992 | Saito |
| 5,159,182 A | 10/1992 | Eisele |
| 5,164,830 A | 11/1992 | Kim |
| 5,172,413 A | 12/1992 | Bradley et al. |
| 5,181,107 A | 1/1993 | Rhoades |
| 5,191,410 A | 3/1993 | McCalley et al. |
| 5,191,573 A | 3/1993 | Hair |
| 5,203,001 A | 4/1993 | Yanagiuchi et al. |
| 5,208,665 A | 5/1993 | McCalley et al. |
| 5,210,611 A | 5/1993 | Yee et al. |
| 5,221,838 A | 6/1993 | Gutman et al. |
| 5,226,080 A | 7/1993 | Cole et al. |
| 5,237,612 A | 8/1993 | Raith |
| D339,329 S | 9/1993 | Lacko |
| D339,554 S | 9/1993 | Davidson |
| 5,247,347 A | 9/1993 | Litteral et al. |
| 5,249,166 A | 9/1993 | Hamilton et al. |
| 5,251,909 A | 10/1993 | Reed et al. |
| 5,253,275 A | 10/1993 | Yurt et al. |
| 5,311,423 A | 5/1994 | Clark |
| 5,319,582 A | 6/1994 | Ma |
| 5,333,116 A | 7/1994 | Hawkins et al. |
| 5,355,302 A | 10/1994 | Martin et al. |
| 5,357,475 A | 10/1994 | Hasbun et al. |
| 5,359,698 A | 10/1994 | Goldberg et al. |
| 5,365,502 A | 11/1994 | Misono |
| 5,371,532 A | 12/1994 | Gerlman et al. |
| 5,383,112 A | 1/1995 | Clark |
| 5,388,196 A | 2/1995 | Pajak et al. |
| 5,406,626 A | 4/1995 | Ryan |
| D358,364 S | 5/1995 | Siddoway |
| 5,420,690 A | 5/1995 | Koishi |
| 5,440,336 A | 8/1995 | Buhro et al. |
| 5,442,389 A | 8/1995 | Blahut et al. |
| 5,442,390 A | 8/1995 | Hooper et al. |
| 5,442,789 A | 8/1995 | Baker et al. |
| 5,463,601 A | 10/1995 | Yanagisawa |
| 5,483,658 A | 1/1996 | Grube et al. |
| D366,874 S | 2/1996 | Robinson et al. |
| 5,491,774 A | 2/1996 | Norris et al. |
| 5,491,820 A | 2/1996 | Belove et al. |
| 5,493,677 A | 2/1996 | Balogh et al. |
| 5,499,221 A | 3/1996 | Ito et al. |
| 5,499,294 A | 3/1996 | Friedman |
| 5,504,815 A | 4/1996 | Ryan et al. |
| 5,506,904 A | 4/1996 | Sheldrick et al. |
| 5,511,000 A | 4/1996 | Kaloi et al. |
| 5,511,122 A | 4/1996 | Atkinson |
| 5,513,260 A | 4/1996 | Ryan |
| D370,484 S | 6/1996 | Williamson et al. |
| 5,524,051 A | 6/1996 | Ryan |
| 5,539,658 A | 7/1996 | McCullough |
| 5,541,638 A | 7/1996 | Story |
| 5,550,863 A | 8/1996 | Yurt et al. |
| 5,553,143 A | 9/1996 | Ross et al. |
| 5,555,098 A | 9/1996 | Parulski |
| 5,557,541 A | 9/1996 | Schulhof et al. |
| 5,572,442 A | 11/1996 | Schulhof et al. |
| 5,574,787 A | 11/1996 | Ryan |
| 5,579,471 A | 11/1996 | Barber et al. |
| 5,586,186 A | 12/1996 | Yuval et al. |
| 5,590,195 A | 12/1996 | Ryan |
| 5,592,511 A | 1/1997 | Schoen et al. |
| 5,615,061 A | 3/1997 | Singh |
| D379,456 S | 5/1997 | Osiecki |
| 5,629,980 A | 5/1997 | Stefik et al. |
| 5,630,121 A | 5/1997 | Braden-Harder et al. |
| 5,634,012 A | 5/1997 | Stefik et al. |
| 5,634,080 A | 5/1997 | Kikinis et al. |
| 5,636,276 A | 6/1997 | Brugger |
| 5,638,443 A | 6/1997 | Stefik et al. |
| 5,646,992 A | 7/1997 | Subler et al. |
| 5,646,997 A | 7/1997 | Barton |
| 5,659,613 A | 8/1997 | Copeland et al. |
| 5,664,228 A | 9/1997 | Mital |
| 5,669,283 A | 9/1997 | Iida et al. |
| 5,673,315 A | 9/1997 | Wolf |
| 5,673,316 A | 9/1997 | Auerbach et al. |
| 5,675,734 A | 10/1997 | Hair |
| 5,699,526 A | 12/1997 | Siefert |
| 5,715,403 A | 2/1998 | Stefik |
| 5,724,582 A | 3/1998 | Pelanek et al. |
| 5,727,156 A | 3/1998 | Herr-Hoyman et al. |
| 5,727,159 A | 3/1998 | Kikinis |
| 5,732,219 A | 3/1998 | Blumer et al. |
| 5,734,719 A | 3/1998 | Tsevdos et al. |
| 5,734,823 A | 3/1998 | Saigh et al. |
| 5,734,891 A | 3/1998 | Saigh |
| 5,745,568 A | 4/1998 | O'Connor et al. |
| 5,745,879 A | 4/1998 | Wyman |
| 5,752,244 A | 5/1998 | Rose et al. |
| 5,757,907 A | 5/1998 | Cooper et al. |
| 5,758,069 A | 5/1998 | Olsen |
| 5,761,485 A | 6/1998 | Munyan |
| 5,769,269 A | 6/1998 | Peters |
| 5,781,723 A | 7/1998 | Yee et al. |
| 5,790,664 A * | 8/1998 | Coley et al. .................. 709/203 |
| 5,793,980 A | 8/1998 | Glaser et al. |
| 5,796,824 A | 8/1998 | Hasebe et al. |
| 5,809,144 A | 9/1998 | Sirbu et al. |
| 5,809,246 A | 9/1998 | Goldman |
| 5,819,043 A | 10/1998 | Baugher et al. |
| 5,825,883 A | 10/1998 | Archibald et al. |
| 5,841,979 A | 11/1998 | Schulhof et al. |
| 5,845,065 A | 12/1998 | Conte et al. |
| 5,860,068 A | 1/1999 | Cook |

(56) References Cited

U.S. PATENT DOCUMENTS

| | | | |
|---|---|---|---|
| 5,881,225 A | 3/1999 | Worth | |
| 5,889,860 A | 3/1999 | Eller et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,918,213 A | 6/1999 | Bernard et al. | |
| 5,920,861 A | 7/1999 | Hall et al. | |
| 5,926,624 A | 7/1999 | Katz et al. | |
| 5,928,330 A | 7/1999 | Goetz et al. | |
| D413,097 S | 8/1999 | Chang | |
| 5,931,901 A | 8/1999 | Wolfe et al. | |
| 5,933,498 A | 8/1999 | Schneck et al. | |
| 5,940,504 A | 8/1999 | Griswold | |
| 5,943,422 A | 8/1999 | Van Wie et al. | |
| 5,949,876 A | 9/1999 | Ginter et al. | |
| 5,963,916 A | 10/1999 | Kaplan | |
| 5,966,440 A | 10/1999 | Hair | |
| 5,969,283 A | 10/1999 | Looney et al. | |
| 5,970,252 A | 10/1999 | Buxton et al. | |
| 5,982,891 A | 11/1999 | Ginter et al. | |
| 5,991,402 A | 11/1999 | Jia et al. | |
| 5,995,705 A | 11/1999 | Lang | |
| 6,002,720 A | 12/1999 | Yurt et al. | |
| 6,005,938 A | 12/1999 | Banker et al. | |
| D419,956 S | 2/2000 | Lucaci et al. | |
| 6,026,368 A | 2/2000 | Brown et al. | |
| 6,028,936 A | 2/2000 | Hillis | |
| 6,044,471 A | 3/2000 | Colvin | |
| 6,067,562 A | 5/2000 | Goldman | |
| 6,088,450 A | 7/2000 | Davis et al. | |
| 6,112,181 A | 8/2000 | Shear et al. | |
| 6,138,119 A | 10/2000 | Hall et al. | |
| 6,141,693 A | 10/2000 | Perlman et al. | |
| 6,157,721 A | 12/2000 | Shear et al. | |
| 6,157,929 A | 12/2000 | Zamiska et al. | |
| 6,158,005 A | 12/2000 | Bharathan et al. | |
| 6,170,060 B1 | 1/2001 | Mott et al. | |
| 6,182,126 B1 | 1/2001 | Nathan et al. | |
| 6,185,683 B1 | 2/2001 | Ginter et al. | |
| 6,226,618 B1 * | 5/2001 | Downs et al. | 705/51 |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,363,488 B1 | 3/2002 | Ginter et al. | |
| 6,385,596 B1 | 5/2002 | Wiser et al. | |
| 6,389,402 B1 | 5/2002 | Ginter et al. | |
| 6,389,538 B1 * | 5/2002 | Gruse et al. | 713/194 |
| 6,389,541 B1 | 5/2002 | Patterson | |
| 6,427,140 B1 | 7/2002 | Ginter et al. | |
| 6,449,367 B2 | 9/2002 | Van Wie et al. | |
| 8,175,977 B2 * | 5/2012 | Story et al. | 705/59 |

FOREIGN PATENT DOCUMENTS

| | | |
|---|---|---|
| FR | 2651352 | 3/1991 |
| WO | WO 87/04309 | 7/1987 |
| WO | WO 96/35987 | 11/1996 |
| WO | WO 00/39730 A1 | 7/2000 |

OTHER PUBLICATIONS

Be Listening Up: PC Today Features News Article on Information Highway, Media Corporation 76 PC Today, Jan. 1985, 1 p.

Buying Music Over the Internet, Newsbytes, http://drlink.mnis.net/cgi-bin/index.cg..N=Reynolds%2C+Pamela&U =preynolds&B = Rank, Jan. 1997.

Chang, Yee-Hsiang, et al., An Open-Systems Approach to Video on Demand, IEEE Communications Magazine, May 1994, pp. 68-79.

Cox, Meg; Electronic Campus, Technology Threatens to Shatter the World of College Textbooks; The Wall Street Journal; Tuesday, Jun. 1, 1993, 2 pgs.

Deloddere, Daniel, et al., Interactive Video on Demand, IEEE Communications Magazine, May 1994, pp. 82-88.

Desmedt, Yvo, et al., Multi-Receiver/Multi-Sender Network Security: Efficient Authenticated Multicast/Feedback, Infocom '92 IEEE, pp. 2045-2054.

Dvorak, Radka, et al; A Methodology for User Centered Link Structures for Textbooks to Hypertext Conversion; IEEE 1992, pp. 619-628.

Fern, Kwo-Jean, et al., An Authenticate Processing for the Information System in Industrial Technology Research Institute, in IEEE International Carnahan Conference on Security Technology, 1991, pp. 59-67.

Fisher, Daniel; Technology and You; This Little Computer Tries to Be a Book; St. Louis Post-Dispatch; Wednesday, Jan. 4, 1995; 2 pgs.

Jones, Richard J., Baseband and Passband Transport Systems for Interactive Video Services, IEEE Communications Magazine, May 1994, pp. 90-101.

Kang, Chang Goo. New Digital Multisignature Scheme in Electronic Contract Systems, Proceedings 1995 IEEE International Symposium on Information Theory: Whistler Conference Centre, Whistler, British Columbia, Canada, Sep. 17-22, 1995, p. 486.

Kaplan, Marc A., IBM Cryptolopes$^{TM}$, Super Distribution and Digital Rights Management, http://www.research.ibm.com/people/kaplan/crypotolope-docs/crypap.html, Mar. 27, 2000, 9 pgs.

Listen Up Audio System and Audio-on-Demand Subscription Service Write-Up, Electronic Entertainment. Feb., 1 p.

Listen Up Audio System and Audio-an-Demand to Open New Infobahn On-Ramp, Information Highway Media Corporation, IHM-94001.F.Sep. 19, 1994, 1 pg.

Microsoft Computer Dictionary (Microsoft Press 2$^{nd}$ ed.), 1994, pp. 188-213.

Nessett, D.M., Layering Central Authentication on Existing Distributed System Terminal Services, IEEE 1989, pp. 290-299.

Pobiak, Bernard Conan; Adjustable Access Electronic Books; IEEE 1992; pp. 90-94.

Ramanathan, Sprinivas et al., Architectures for Personalized Multimedia, IEEE Multimedia, 1994, pp. 37-46.

Ramos, Tony; Can You Digit?; Making Book on Electronic Books; Collegestore Journal; Sep./Oct. 1992; 2 pgs.

Read Me a Story, Popular Mechanics, Feb. 1995, 1 p.

Schulof, Nathan, Silicon Valley Start-Up to Create New On-ramp to the Information Superhighway with its Listen-Up Audio System and Audio On-Demand Subscription Service, Information Highway Media Corporation, Sep. 1994,3 pp.

Steinert-Threlkeld, Tom; Now, Data by Satellite; Inter@ctive Week; 1 pg.

The Captive Audience Network, 44 Popular Science, Feb. 1995, 1 p.

The Heller Report; vol. IV; No. 12, Oct. 1993; 3 pgs.

Watanabe, Toyohide, et al; Visual Interface for Retrieval of Electronic-Formed Books; IEEE 1993; pp. 692-695.

Web Review-Liquid Audio Fine Tunies Music on Demand, John Gilles, http://www.webreview.com/97/01/03lfeature/index.html. Jan. 1997.

Ziegler, Bart; IBM to Unveil Plan to Skip Disks, Send Software by Satellite; The Wall Street Journal; Tuesday, Nov. 1, 1994; 1 pg.

* cited by examiner

LICENSE MANAGEMENT FOR DIGITAL CONTENT

CROSS-REFERENCE TO RELATED APPLICATIONS

This application is a continuation of U.S. patent application Ser. No. 09/222,336, filed on Dec. 28, 1998, the entirety of which is incorporated herein by reference.

BACKGROUND OF THE INVENTION

The present invention relates to digital information playback. More particularly, the present invention relates to management of licenses for playback of digital information.

Technology currently exists through compression of digital data, storage devices and network bandwidth to distribute large amounts of digital data to many geographically disparate locations. This technology has allowed more users access to more information in digital format than would otherwise be possible. One form of digital data is audio/visual (A/V) programming, including audio-only programming and video-only programming as well as combined audio/visual programming. Sources now exist that provide A/V programming, including audio recording of novels (audio books), recording of conversations, commentaries, news, educational material, etc. as well as recordings that include video content generally referred to as digital content.

Digital content can be played using a hardware device or software player on a personal or other type of computer system. Hardware playback devices are typically small lightweight devices having a special purpose processor coupled to memory, such as flash memory, that plays the stored digital content. Software players are software entities executed by computer systems that use the computer system memory to store the digital content and the computer system A/V capabilities to play the digital content.

What is needed is a license management scheme to prevent unauthorized use of digital programming.

SUMMARY OF THE INVENTION

A method and apparatus for digital content license management is disclosed. A license having a cardinality is created by a license management device. The license has an associated cardinality. The license is stored in one or more playback devices. The number of playback devices associated having playback licenses is based, at least in part, on the cardinality. The license is included in digital content. The playback devices are enabled to playback the digital content including the license. In one embodiment, a single license can be used to authorize playback from multiple content providers.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION OF THE PREFERRED EMBODIMENT

A method and apparatus for digital content license management is disclosed. In the following description, for purposes of explanation, numerous specific details are set forth in order to provide a thorough understanding of the present invention. It will be apparent, however, to one skilled in the art that the present invention can be practiced without these specific details. In other instances, structures and devices are shown in block diagram form in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides one or more license management devices that manage licenses for playback of digital content. The license management devices create licenses having an associated cardinality that determines the number of playback devices that can be authorized by the license. The license is stored in a set of playback devices, where the number of playback devices in the set is less than or equal to the cardinality of the license. In one embodiment, the license management device causes the license to be stored in the set of playback devices by using one or more digitally signed and/or encrypted commands.

The license is also included in digital content that the license authorizes for playback. In one embodiment, the license management device causes the license to be included in the digital content; however, content providers or other authorized agents can also cause the license to be included in the digital content. Playback devices that have a license that matches a license included in the digital content are authorized to play the digital content. In one embodiment a single license can be used to provide authorization to play digital content from multiple sources and/or multiple types of content. Playback devices can store multiple licenses, which allows playback devices to belong to multiple sets of playback devices authorized to playback various digital content. In one embodiment digital content files can contain multiple licenses to allow the content files to be shared by multiple sets of playback devices. In other words, a content file can be shared by different sets of users because the content contains multiple licenses.

Figure 1:
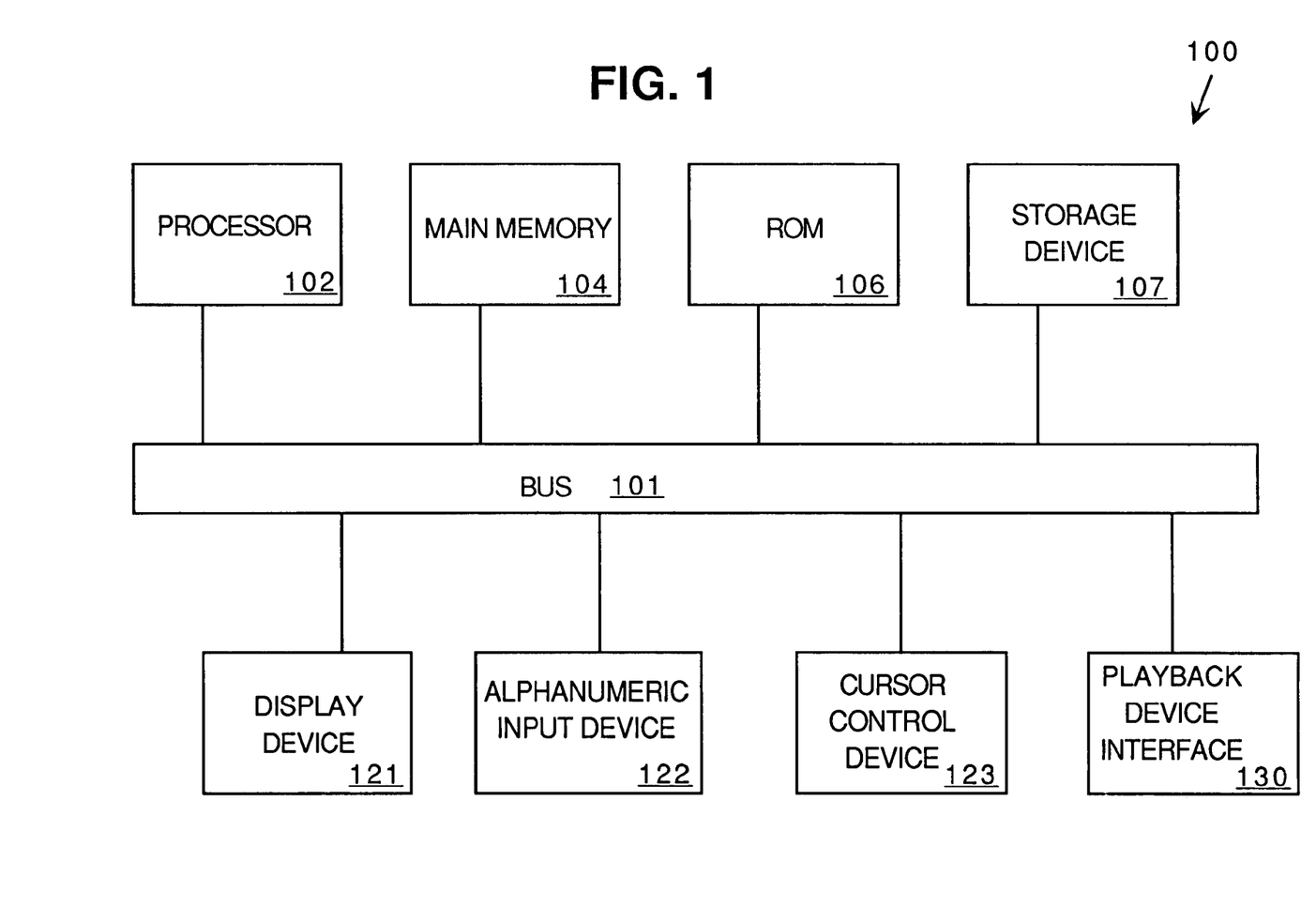
FIG. 1 is one embodiment of a computer system suitable for use with the present invention.

Overview of an Architecture and Devices for Providing Playback of Digital Programming FIG. 1 is one embodiment of a computer system suitable for use with the present invention. Computer system 100 includes bus 101 or other communication device for communicating information, and processor 102 coupled with bus 101 for processing information. Computer system 100 further includes random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also includes read only memory (ROM) and/or other static storage device 106 coupled to bus 101 for storing static information and instructions for processor 102. Data storage device 107 is coupled to bus 101 for storing information and instructions.

Data storage device 107 such as a magnetic disk or optical disc and its corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

In one embodiment, computer system 100 further includes playback device interface 130 that provides a communications interface between computer system 100 and a mobile playback device (not shown in FIG. 1). Playback device interface 130 can be, for example, a docking station coupled to a port (not shown in FIG. 1) of computer system 100 (e.g., serial port, parallel port, SCSI interface). The docking station is configured to receive a mobile playback device. Playback device interface 130 allows computer system 100 to communicate licensing information, digital content, and other data to and receive data from a mobile playback device.

In one embodiment, the present invention is related to the use of computer system 100 to provide, manage and/or receive licenses for digital content playback devices. According to one embodiment, license management is performed by a computer system, such as computer system 100, in response to processor 102 executing sequences of instructions contained in memory 104.

Instructions are provided to main memory 104 from a storage device, such as magnetic disk, CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software.

Figure 2:
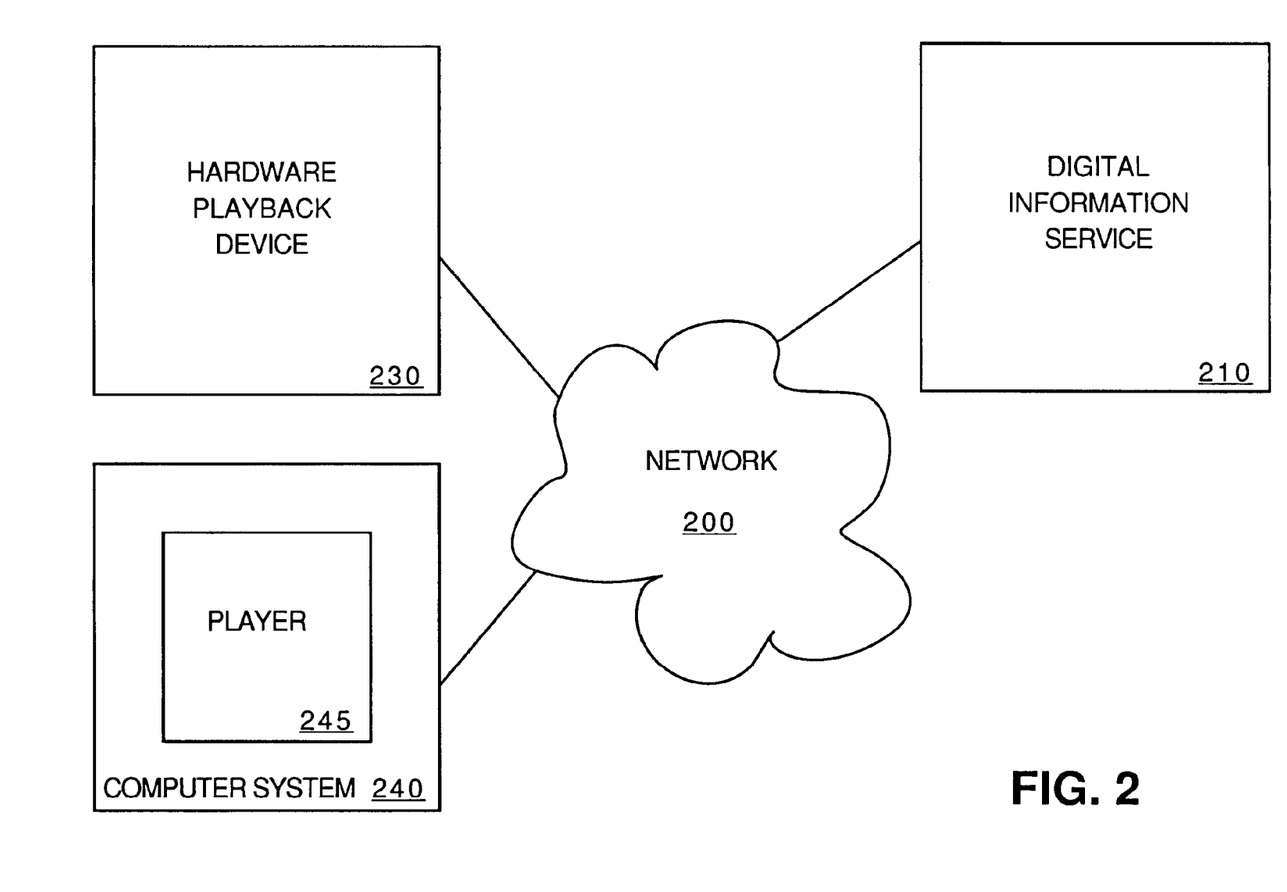
FIG. 2 is one embodiment of an architecture that provides digital information for playback suitable for use with the present invention.

FIG. 2 is one embodiment of an architecture that provides digital information for playback suitable for use with the present invention. Server 210 is coupled to multiple playback devices, including hardware playback devices (e.g., 230) and players (e.g., 245 running on computer system 240), by network 200. Any number of hardware playback devices and players can be coupled to server 210 by network 200.

In one embodiment, network 200 is the Internet; however, other networks can be used. For example, network 200 can be an intranet that couples only computer systems and other devices together that belong to a particular organization. Network 200 can also represent a group of networks, such and a group of local area networks.

Server 210 stores digital information defining programming as well as information about authorized users of the digital information. In one embodiment, server 210 stores a library of digital content that can be retrieved by authorized users for later playback by authorized playback devices. The library of digital content can include audio books, recordings of lecture series, news, plays, movies, etc.

Hardware playback device 230 stores programs from server 210 for playback. Hardware playback device 230 can store all or a portion of one or more programs. Also, hardware playback device 230 can be coupled to network 200 directly or by a computer system (not shown in FIG. 2) that accesses server 210. Computer system 240 runs player 245 and can play digital content from server 210. Server 210 can also be a license management device or another device (not shown in FIG. 2) can be a license management device.

Figure 3:
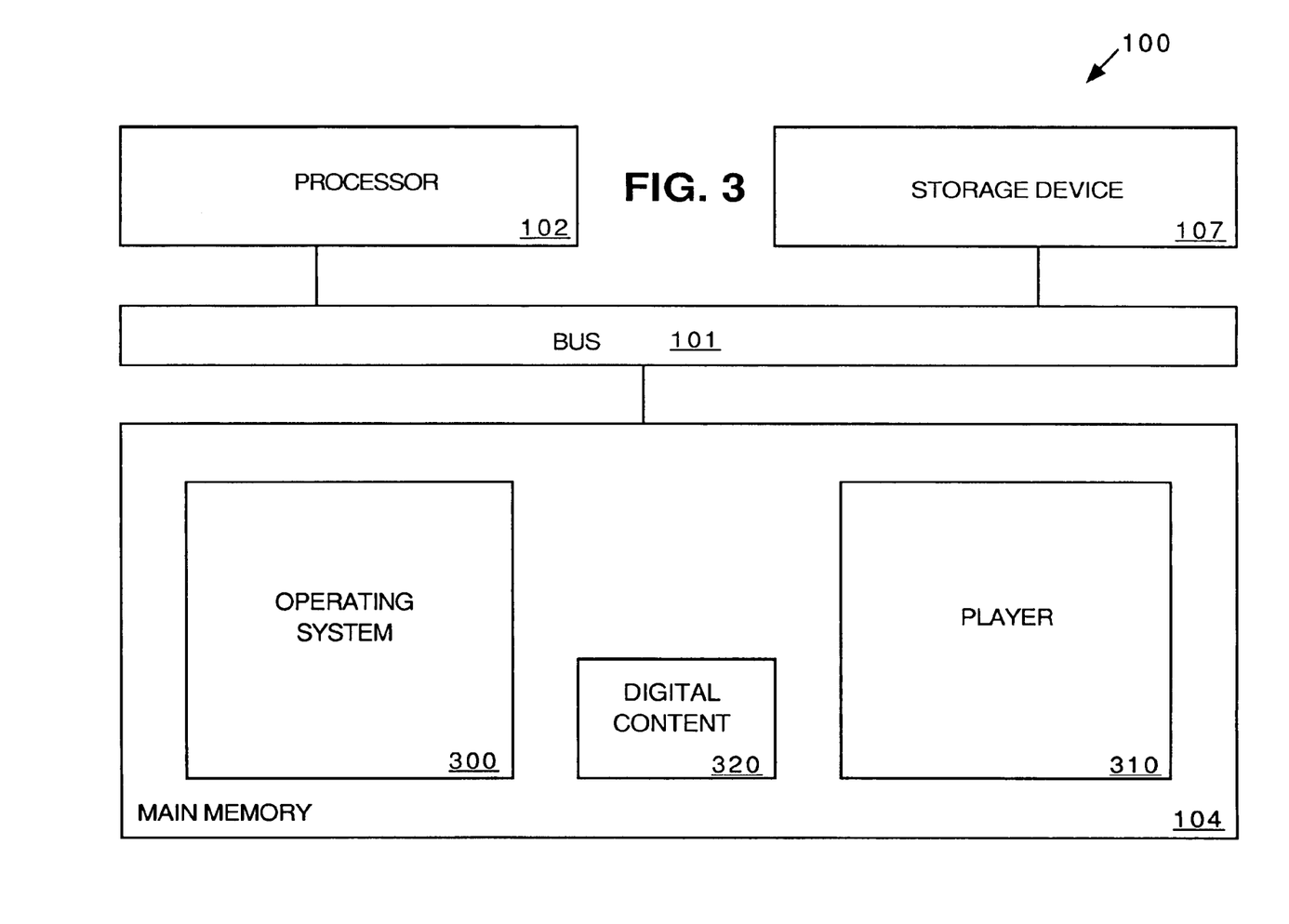
FIG. 3 is one embodiment of a computer system running a digital information player suitable for use with the present invention.

FIG. 3 is one embodiment of a computer system running a digital information player suitable for use with the present invention. Processor 102 executes sequences of instruction stored in main memory 104 including sequences of instructions defining operating system 300 and player 310.

Main memory 104 further includes digital content 320 that is all or a portion of programming received from the server. Additional programs, or additional portions of digital content 320, can be stored by storage device 107 and copied to main memory 104 as necessary.

Processor 102 retrieves data from digital content 320 and outputs audio and/or video in response to the data. Processor 102 can also retrieve digital content data from a network connection (not shown in FIG. 3) for playback or for storage in main memory 104.

Figure 4:
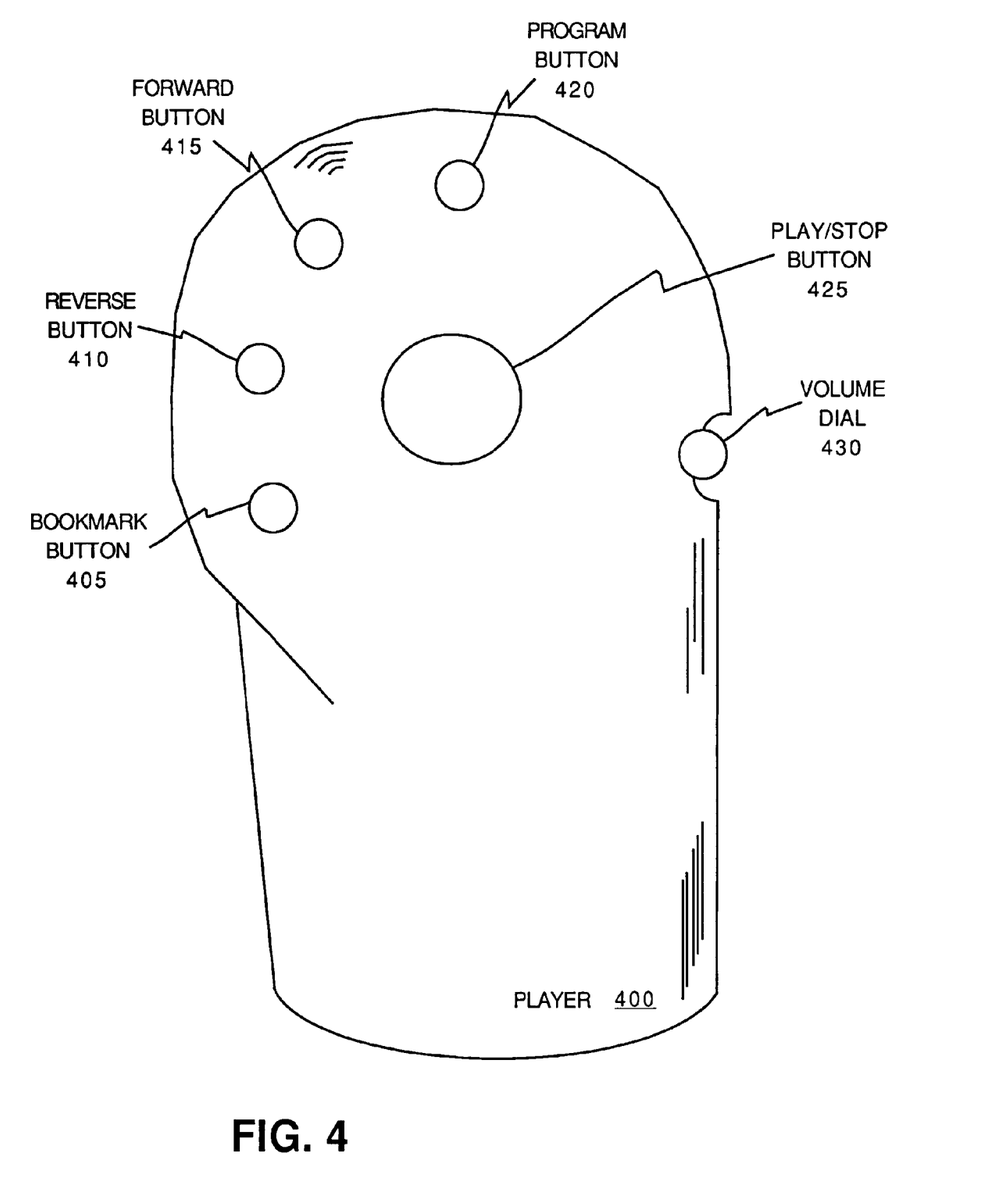
FIG. 4 is a hardware playback device suitable for use with the present invention.

FIG. 4 is a hardware playback device suitable for use with the present invention. Player 400 is a mobile playback device that allows digital content to be downloaded, for example, via a playback device interface a played back later. A user can utilize the buttons on player 400 to navigate through stored data to replay desired digital content.

Player 400 includes buttons 405, 410, 415, 420 and 425 and volume dial 430. Further details of player 400 can be found in U.S. patent application Ser. No. 08/710,114 filed Sep. 12, 1996. In summary, player 400 includes a processor and internal random access memory (RAM), read only memory (ROM) and a memory storage device such as flash memory. In one embodiment the ROM stores an operating system, while the flash memory (or other memory storage device) stores digital content.

Player 400 can also include an interface to receive removable media to store digital content. For example, flash memory cards storing audio content can be inserted into player 400. Digital content stored on the removable media can be played back directly from the removable media or copied from the removable media and stored in player 400 for later playback.

Overview of License Management

Figure 5:
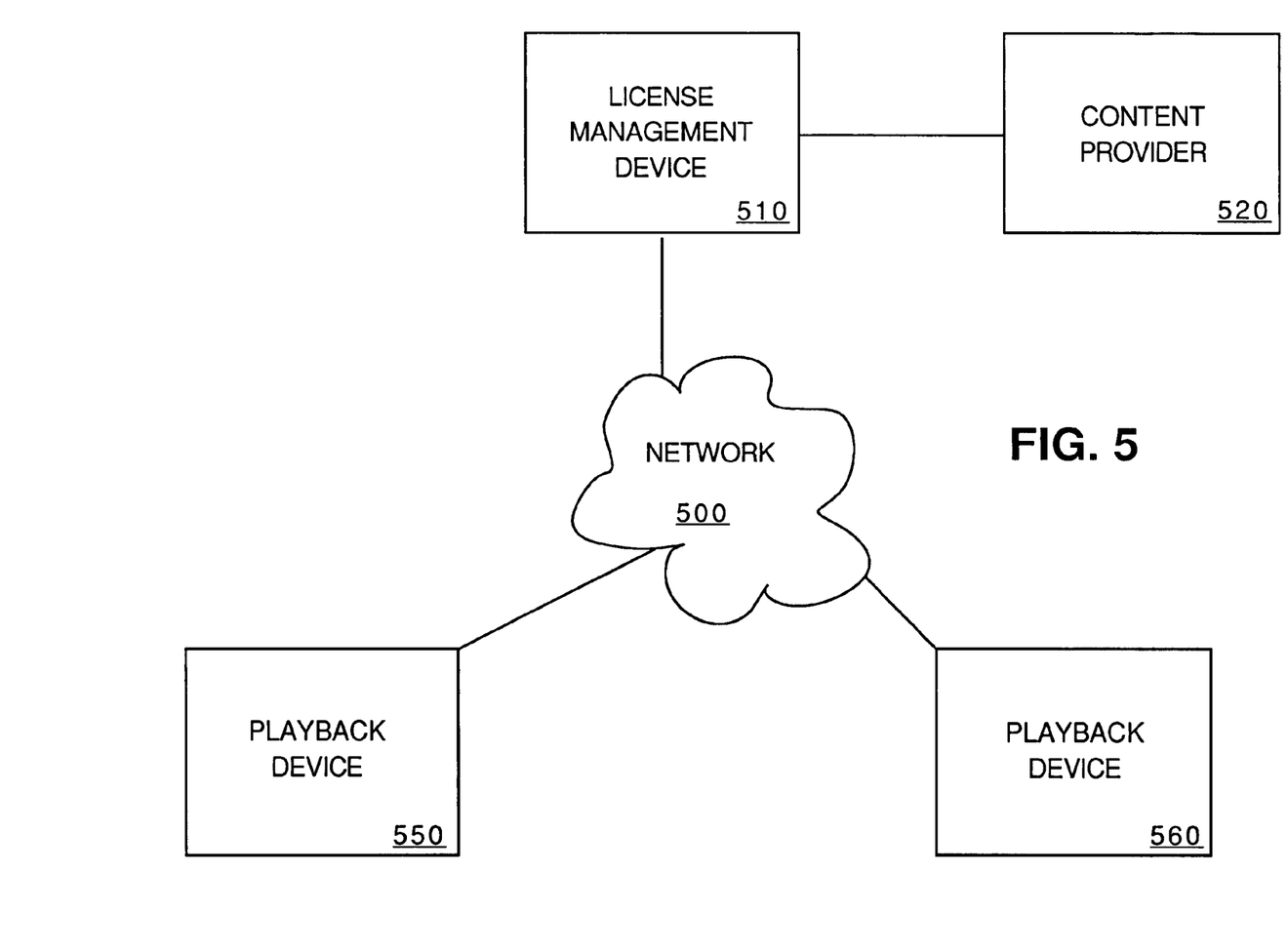
FIG. 5 is an architecture for license management according to one embodiment of the present invention.

FIG. 5 is an architecture for license management according to one embodiment of the present invention. The architecture of FIG. 5 provides centralized license management; however, more distributed license management devices can also be used.

Network 500 provides an interconnection between the components of FIG. 5. In one embodiment network 500 is the Internet; however, other networks can also be used. Playback devices 550 and 560 are coupled to license management device 510 via network 500. Playback devices 550 and 560 can be hardware playback devices, such as the playback device of FIG. 4, or a software playback device, such as the player of FIG. 3. Playback devices can also receive digital content from other sources such as removable media (e.g., CD-ROM, flash memory cards) or one way communications (e.g., broadcast).

In one embodiment, license management device 510 is a server and provides centralized license management for multiple playback devices. While the architecture of FIG. 5 has only a single license management device, multiple license management devices can be provided to distribute license management duties. As described in greater detail below license management device 510 creates licenses that enable playback devices to play digital content.

License management device 510 communicates with content provider 520 to manage licenses for digital content owned by content provider 520. License management device 510 can communicate with multiple content providers as well as agents of a content provider, or other parties authorized to distribute digital content owned by a content provider.

In operation, license management device 510 creates a license having a cardinality in response to a request. In one embodiment, authentication (e.g., login name and password) is required from a license requestor to authorize license creation. For example, an owner of a playback device can request a license to authorize a playback device he or she owns for playback of specified digital content by logging in to a specific Web Page associated with license management device 510. In one embodiment, the cardinality of the license determines the number of playback devices that the license authorizes to play digital content. The license created by license management device 510 is stored in one or more playback devices (e.g., 550 and/or 560).

The license is also communicated to content provider 520 by license management device 510. In one embodiment content provider 520 embeds the license in digital content for which the owner of the playback device is authorized to play. Alternatively, license management device 510 issues a command that causes the license to be embedded in the digital content, or a license can be embedded in the digital content by the licensee. License management device 510 can also embed the license in the digital content. The license can be associated with the digital content in another manner.

When a playback device receives digital content, the playback device checks the digital content for a license that matches the license stored in the playback device. If the licenses match, the playback device is authorized to, and is enabled to, play the digital content, which includes decrypting the digital content if necessary. Otherwise the playback device does not play the digital content.

License management device 510 enforces the cardinality restrictions of the licenses created. In one embodiment, license management device 510 causes licenses to be stored by playback devices by issuing one or more commands to the playback devices to which the licenses are targeted. In one embodiment, the commands are encrypted and/or signed to prevent cloning. License management device 510 can also cause the license to be included in digital content in a similar manner. Alternatively, license management device 510 can communicate the creation of a license to an appropriate content provider that, in turn, includes the license in digital content.

In one embodiment, the license comprises a 32 bit group identifier; however, other identifier sizes can also be used. Thus, each playback device storing a license belongs to a set of one or more playback devices storing the license. The set of playback devices is authorized to play digital content that includes the license. Multiple licenses can be granted for any digital content. For example, a corporation having 100 employees, each having a playback device, can obtain a license having a cardinality of 100 to authorize each employee to play digital content obtained by the corporation. An individual can obtain a license with a cardinality of one for personal use of digital content. Digital content including both licenses can be played by the individual as well as employees of the corporation.

In the following example, it is assumed that a household of four individuals (Husband, Wife, Son and Daughter) has four playback devices; one for each individual. Each member of the household may wish to have access to the "New York Times." The household obtains a license with a cardinality of four to store in each of the playback devices. The playback devices are then authorized to play digital versions of the "New York Times" that include the license that is also stored in the playback devices.

The members of the household may also wish to have access to "People." The license used for the "New York Times" can also be used for "People." The license management device communicates to the content provider that provides "People" that the previously generated license should be used to authorize playback of "People." The provider of "People" includes the license in a digital version of "People" and the playback devices can play digital versions of "People."

Husband and Son may wish to have access to "Sports Illustrated." The household obtains a license with a cardinality of two. The license is stored in the playback devices used by Husband and Son as well as communicated to the provider of "Sports Illustrated." The provider of "Sports Illustrated" includes the license in a digital version of "Sports Illustrated" and the two playback devices storing the license with cardinality of two are authorized to play "Sports Illustrated."

In one embodiment license management device 510 is necessary to either add or remove licenses from a playback device. Thus, license management device 510 can be used to provide centralized license management. In one embodiment, addition of a license to a playback device can only be accomplished with the permission of the license owner. However, licenses can be removed from the playback device without the permission of the license owner. In one embodiment, transfer of licenses between playback devices is accomplished through license management device 510.

Figure 6:
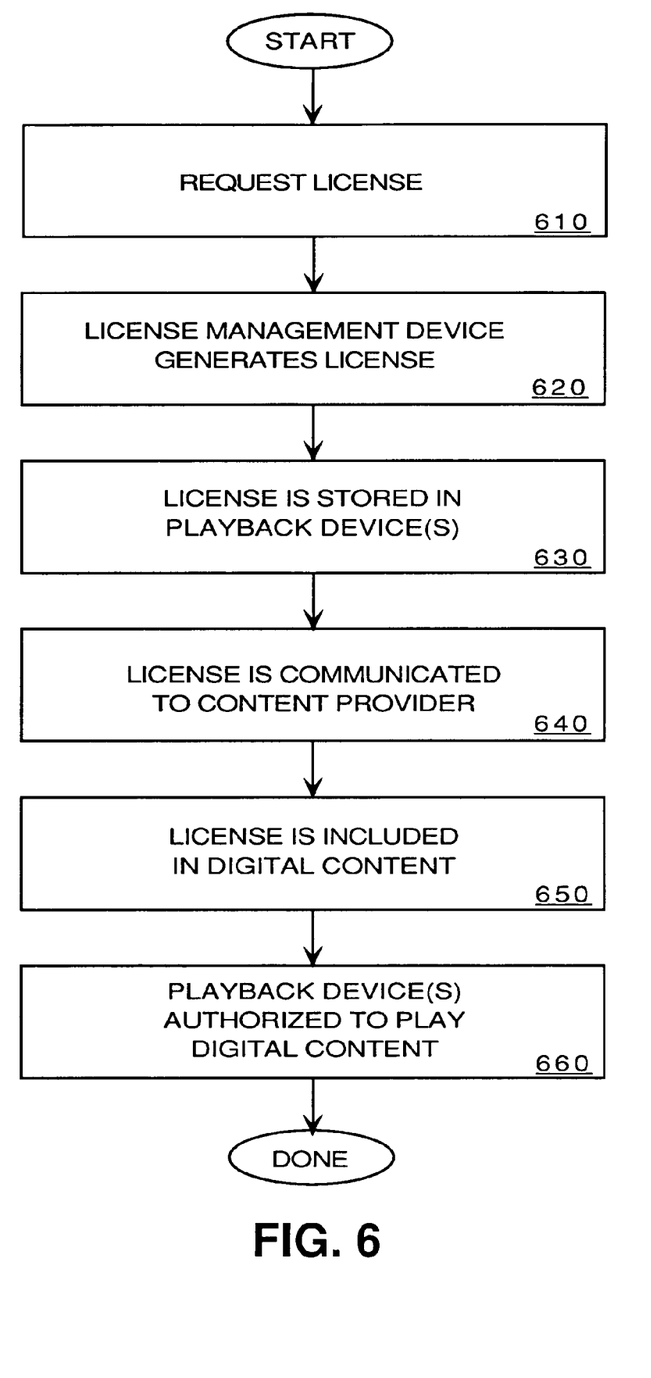
FIG. 6 is a flow diagram for authorizing playback of digital content with a playback device according to one embodiment of the present invention.

FIG. 6 is a flow diagram for authorizing playback of digital content with a playback device according to one embodiment of the present invention. A license is requested at 610. In one embodiment, a user of a playback device accesses a license management device and requests a license having a specific cardinality. For example, the user can access a Web page that provides license management services and/or provides audio content.

The license management device creates a license at 620. The license has a cardinality that determines the number of playback devices in which the license can be stored. In one embodiment, the cardinality is fixed and cannot be modified after the license is generated. Alternatively, the cardinality can be modified after the license is generated. The cardinality can be any value. In one embodiment, zero cardinality represents availability to an unlimited number of playback devices.

The license is stored in a set of one or more playback devices at 630. In one embodiment, the license management device issues a command to one or more specific playback devices. The command includes a player identifier for each of the one or more players targeted and is encrypted and digitally signed by the license management device. The license is stored in the playback device if the command originates from an authorized source and includes the identifier of the playback device. Alternatively, the license can be stored in the set of playback devices in another manner.

The license is communicated to a content provider or other party that distributes digital content at 640. The content provider includes the license in digital content at 650. In one embodiment, the content provider stores one or more licenses in digital content targeted for playback devices having corresponding licenses. Alternatively, the content provider can include a list of all current licenses in the digital content. In another embodiment, the license management device causes the license to be stored in the digital content in a manner similar to storage of the license in the set of playback devices described above.

The one or more playback devices having the license are authorized to play the digital content at 660. In one embodiment, the licenses stored in the playback devices and the licenses stored in the digital content are encrypted to prevent copying and/or signed to verify the origin of the license.

Obtaining a license as described above with respect to FIG. 6 can be used to obtain additional licenses having, for example, a different cardinality or an equal cardinality for use with a different group of playback devices. Any number of licenses can be stored in a playback device based on the storage capacity available in the playback device to store licenses. Thus, any number of arrangement of sets of playback devices can be authorized to play digital content.

Figure 7:
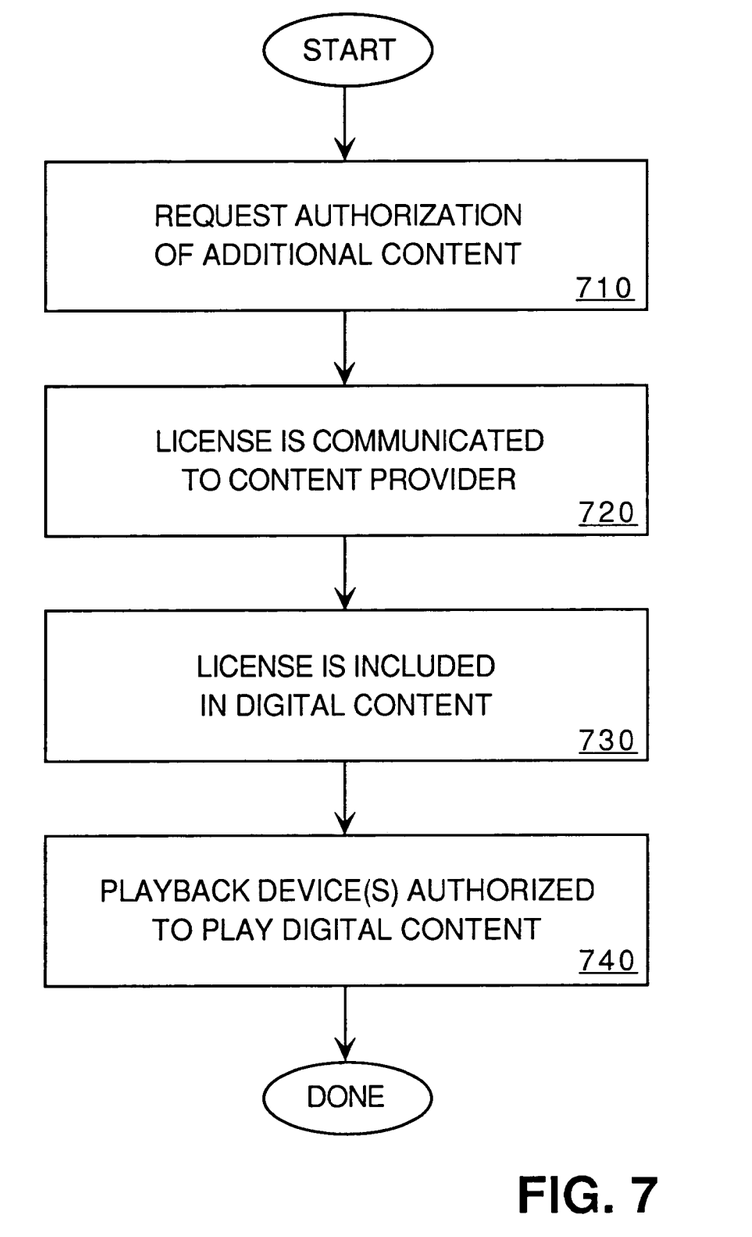
FIG. 7 is a flow diagram for adding digital content to be authorized with an existing license according to one embodiment of the present invention.

FIG. 7 is a flow diagram for adding digital content to be authorized with an existing license according to one embodiment of the present invention. The flow of FIG. 7 can be used, for example, if a group of one or more users having a pre-existing license wish to have access to additional and/or different digital content.

Authorization of additional content is requested at 710. In one embodiment, the owner of the license accesses a license management device and requests that an existing license be used to authorize additional content. For example, a user can access a license management Web page and request that a pre-existing license for the "New York Times" also be used to authorize the same playback devices to play "People."

The license request is communicated to the provider of the newly requested content at 720. The content provider includes the license with the content at 730. The one or more playback devices storing the license are authorized to play the newly requested digital content at 740. Thus, a single license can be used for digital content from multiple content providers as well as multiple types of content programming (e.g., the "New York Times" and "People").

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method for managing license information associated with digital content comprising:
under control of one or more serve computers implemented with specific computer readable instructions,
identifying a number of playback devices that can be authorized to playback digital content associated with a license, each playback device including a processor configured to facilitate playback of the digital content, wherein the number of playback devices is indicated by the license, and wherein the number of playback devices are authorized regardless of type of playback device;
transmitting via a communication network, first license information corresponding to the license to a set of playback devices, wherein the set of playback devices includes no more than the number of playback devices authorized by the license;
generating second license information corresponding to the license, wherein the second license information, when associated with an item of digital content, authorizes a playback device to play the item of digital content only if the playback device includes the first license information; and
transmitting the second license information to at least one playback device of the set of playback devices.

2. The computer-implemented method of claim 1, wherein transmitting the license information to at least one playback device of the set of playback devices comprises transmitting the license information to a content provider, wherein the content provider transmits the second license information to the at least one playback device.

3. The computer-implemented method of claim 1, wherein transmitting the second license information to at least one playback device of the set of playback devices comprises:
associating the second license information with the first item of digital content; and
transmitting the item of digital content to the at least one playback device.

4. The computer-implemented method of claim 3 further comprising:
associating additional license information with the item of digital content, wherein the additional license information corresponds to an additional license indicating an additional set of playback devices that can be authorized to playback the item of digital content; and
transmitting the digital content to at least one playback device of the additional set of playback devices.

5. The computer-implemented method of claim 1, wherein the item digital content comprises at least one of audio content or visual content.

6. The computer-implemented method of claim 1, wherein the item of digital content comprises at least one of audio book content, lecture content, news content, movie content, theatrical content, educational content, and commentary.

7. A system for managing license information associated with digital content, the system comprising:
a data store that stores a first license information corresponding to a license; and
a processor in communication with the data store, the processor, which when executing computer-executable instructions, performs operations comprising:
identifying a number of playback devices that can be authorized to playback digital content associate with the license, wherein the number of playback devices is indicated by the license, and wherein the number of playback devices are authorized regardless of type of playback device;
transmitting the first license information to a set of playback devices, wherein the set of playback devices includes no more than the number of playback devices authorized by the license;
generating second license information corresponding to the license, wherein the second license information, when associated with an item of digital content, authorizes a playback device to play the item of digital content only if the playback device includes the first license information; and
transmitting the second license information corresponding to the license to at least one playback device of the set of playback devices.

8. The system of claim 7, wherein transmitting the second license information corresponding to the license to at least one playback device of the set of playback devices includes transmitting the second license information corresponding to the license to a content provider, and wherein the content provider transmits the second license information corresponding to the license to the at least one playback device.

9. The system of claim 7, wherein the at least one playback device comprises at least one of a hardware playback device or a software playback device.

10. The system of claim 7, wherein the number of playback devices that can be authorized is at least one of fixed, variable, or unlimited.

11. The system of claim 7, wherein the operations further comprise:
associating the second license information corresponding to the license with the item of digital content; and
transmitting the item of digital content to the at least one playback device.

12. A non-transitory, computer-readable medium including one or more computer executable modules, said computer executable modules comprising:
a first module that, when executed by a processor, causes the processor to at least:
generate first license information corresponding to a license, wherein the first license information identifies a number of playback devices that can be authorized to playback digital content associated with the license, and wherein the number of playback devices are authorized regardless of type of playback device; and
transmit the first license information to a set of playback devices, the set of playback devices includes no more than the number of playback devices authorized by the license; and
a second module that, when executed by a processor, causes the processor to at least:
generate second license information corresponding to the license that, when associated with an item of digital content, authorizes a playback device to playback the item of digital content only if the playback device includes the first license information; and
transmit the second license information to at least one playback device of the set of playback devices.

13. The non-transitory, computer-readable medium of claim 12, wherein transmission of the second license information corresponding to the license to at least one playback device of the set of playback devices includes transmission of the second license information corresponding to the license to a content provider, and wherein the content provider transmits the second license information corresponding to the license to the at least one playback device.

14. The non-transitory, computer-readable medium of claim 12, wherein the item of digital content comprises at least one of audio content or visual content.

15. The non-transitory, computer-readable medium of claim 12, wherein the item of digital content comprises at least one of audio book content, lecture content, news content, movie content, theatrical content, educational content, or commentary.

16. The non-transitory, computer-readable medium of claim 12, wherein the one or more computer executable modules further comprises a third module that, when executed by a processor, causes the processor to at least associate the second license information with the item of digital content.

17. The non-transitory, computer-readable medium of claim 16, wherein said association of the second license information with the item of digital content occurs prior to transmission of the second license information corresponding to the license to at least one playback device of the set of playback device.

18. The non-transitory, computer-readable medium of claim 16, wherein transmission of the second license information corresponding to the license to at least one playback device of the set of playback devices includes transmission of the item of digital content.

19. The non-transitory, computer-readable medium of claim 12, wherein the number of playback devices that can be authorized is at least one of a fixed number, a variable number, or an unlimited number.

20. The non-transitory, computer-readable medium of claim 12, wherein the playback device comprises at least one of a hardware playback device, or a software playback device implemented by a physical computing device.

* * * * *

UNITED STATES PATENT AND TRADEMARK OFFICE
CERTIFICATE OF CORRECTION

PATENT NO. : 9,002,746 B2  Page 1 of 1
APPLICATION NO. : 13/465815
DATED : April 7, 2015
INVENTOR(S) : Guy A. Story, Jr.

It is certified that error appears in the above-identified patent and that said Letters Patent is hereby corrected as shown below:

IN THE DRAWINGS

Sheet 1 of 7 (Referral Numeral 107, FIG. 1) at line 2, Change "DEIVICE" to --DEVICE--.

IN THE SPECIFICATION

In column 5 at line 5, Change "enable" to --enables--.

IN THE CLAIMS

In column 7 at line 55, In Claim 1, change "content" to --content,--.

In column 7 at line 56, In Claim 1, change "serve" to --server--.

In column 7 at line 66, In Claim 1, change "transmitting" to --transmitting,--.

In column 8 at line 14, In Claim 2, after "the" insert --second--.

In column 8 at line 22, In Claim 3, after "the" delete "first".

In column 8 at line 33, In Claim 4, after "the" insert --item of--.

In column 8 at line 36, In Claim 5, after "item" insert --of--.

In column 8 at line 41, In Claim 6, change "and" to --or--.

In column 8 at line 44, In Claim 7, change "a" to --at least--. (2nd occurrence)

In column 8 at line 50, In Claim 7, change "associate" to --associated--.

Signed and Sealed this
Twenty-second Day of December, 2015

Michelle K. Lee
*Director of the United States Patent and Trademark Office*